United States Patent
Li et al.

(10) Patent No.: US 11,602,239 B2
(45) Date of Patent: Mar. 14, 2023

(54) SOUP COOKING CONTROL METHOD FOR A PRESSURE COOKER, PRESSURE COOKER, AND COMPUTER-READABLE STORAGE MEDIUM

(71) Applicant: FOSHAN SHUNDE MIDEA ELECTRICAL HEATING APPLIANCES MANUFACTURING CO., LTD., Foshan (CN)

(72) Inventors: Jing Li, Foshan (CN); Ying Su, Foshan (CN); Zhen Fang, Foshan (CN)

(*) Notice: Subject to any disclaimer, the term of this patent is extended or adjusted under 35 U.S.C. 154(b) by 316 days.

(21) Appl. No.: 16/756,129

(22) PCT Filed: Sep. 19, 2018

(86) PCT No.: PCT/CN2018/106367
§ 371 (c)(1),
(2) Date: Apr. 15, 2020

(87) PCT Pub. No.: WO2019/080672
PCT Pub. Date: May 2, 2019

(65) Prior Publication Data
US 2020/0281390 A1    Sep. 10, 2020

(30) Foreign Application Priority Data
Oct. 24, 2017   (CN) .......................... 201711007136.5

(51) Int. Cl.
*A47J 27/08*     (2006.01)
*A47J 27/086*    (2006.01)

(52) U.S. Cl.
CPC ......... *A47J 27/0802* (2013.01); *A47J 27/086* (2013.01)

(58) Field of Classification Search
CPC .......................... A47J 27/0802; A47J 27/086
See application file for complete search history.

(56) References Cited

U.S. PATENT DOCUMENTS

| | | | | |
|---|---|---|---|---|
| 2011/0003048 | A1* | 1/2011 | Sugimoto | A47J 27/086 99/468 |
| 2014/0322416 | A1* | 10/2014 | Sanseverino | A47J 27/0817 219/400 |
| 2016/0198883 | A1* | 7/2016 | Wang | A47J 27/0802 426/231 |

FOREIGN PATENT DOCUMENTS

| | | |
|---|---|---|
| CA | 2640191 A1 | 8/2007 |
| CN | 87207771 U | 6/1988 |

(Continued)

OTHER PUBLICATIONS

"Machine translation of CN 107007130 He, Electric pressure cooker, 2017" (Year: 2017).*

(Continued)

*Primary Examiner* — Brian W Jennison
*Assistant Examiner* — Abigail H Rhue
(74) *Attorney, Agent, or Firm* — Kilpatrick Townsend & Stockton, LLP

(57) ABSTRACT

The present disclosure relates to a soup cooking control method for a pressure cooker, a pressure cooker, and a computer-readable storage medium. The method includes: a preheating and temperature-increasing stage, a medium-high temperature maintenance stage, a high pressure maintenance stage, and a decompression exhaust stage. The medium-high temperature maintenance stage includes: opening the pressure relief valve, to allow the pressure cooker to be in a non-closed state; controlling, under the non-closed state of the pressure cooker, the heating body to supply heat with a first preset heating power, and maintaining an internal temperature of the pressure cooker at a first preset temperature within a first preset duration. The present disclosure solves the problem that when the existing pressure cooker makes soup, insufficient oxidation of fat will (Continued)

cause large amounts of fat in the meat to dissolve, which affects people's health and the taste of the soup.

17 Claims, 2 Drawing Sheets

(56) References Cited

FOREIGN PATENT DOCUMENTS

| CN | 2774346 | Y | 4/2006 | | |
|----|---------|---|--------|---|---|
| CN | 101103745 | A | 1/2008 | | |
| CN | 201070253 | Y | 6/2008 | | |
| CN | 101744226 | A | 6/2010 | | |
| CN | 102204784 | A | 10/2011 | | |
| CN | 202287773 | U | 7/2012 | | |
| CN | 103054457 | A | 4/2013 | | |
| CN | 104336482 | A | 2/2015 | | |
| CN | 105266576 | A | 1/2016 | | |
| CN | 205285994 | U | 6/2016 | | |
| CN | 106136868 | A | 11/2016 | | |
| CN | 107007130 | A | 8/2017 | | |
| CN | 107007130 | A | * | 8/2017 | ............. A47J 27/04 |
| JP | 4969729 | B2 | 11/2002 | | |
| JP | 2004254988 | A | 9/2004 | | |
| JP | 2008142228 | A | 6/2008 | | |
| JP | 2014184125 | A | 10/2014 | | |
| JP | 6026343 | B2 | 11/2016 | | |
| KR | 20170068994 | A | 6/2017 | | |
| WO | WO-2018059994 | A1 | * | 4/2018 | .......... A47J 27/0802 |

OTHER PUBLICATIONS

The first Office Action corresponding to Chinese Application No. 201711007136.5.
Food Technology (vol. 2) Tianjin Institute of Light Industry, China National Industry Press.
OA1 of JP Application No. 2020-511507.
OA2 of CN Application No. 201711007136.5.
OA1 of KR Application No. 10-2020-7001669.
The third OA of CN Application No. 201711007136.5.
International Search Report dated Dec. 19, 2018 in the corresponding International Application No. PCT/CN2018/106367.

* cited by examiner

SOUP COOKING CONTROL METHOD FOR A PRESSURE COOKER, PRESSURE COOKER, AND COMPUTER-READABLE STORAGE MEDIUM

CROSS-REFERENCES TO RELATED APPLICATIONS

The present disclosure is a national phase application of International Application No. PCT/CN2018/106367, filed on Sep. 19, 2018, which claims the priority of Chinese Patent Application with No. 201711007136.5, filed Oct. 24, 2017 with the National Intellectual Property Administration and entitled "soup cooking control method for a pressure cooker, pressure cooker, and computer-readable storage medium", the entirety of which is hereby incorporated herein by reference for all purposes.

FIELD

The present disclosure relates to the field of pressure cookers, and more particularly relates to a soup cooking control method for a pressure cooker, a pressure cooker, and a computer-readable storage medium.

BACKGROUND

Meat has become an indispensable ingredient in people's daily lives due to its nutritional content. However, as people pay more attention to health, they, especially with hyperlipidemia or obesity, will worry about eating too much fat, thus lowering the consumption of the meat.

Currently, a pressure cooker is an important appliance for cooking the meat, especially for making meat soup. The process of making the soup in the existing pressure cooker merely includes a preheating and temperature-increasing stage, a high pressure maintenance stage, and a decompression exhaust stage. That is, when making the soup, the pressure cooker is in a closed state, and accordingly the meat in the pressure cooker is hard to be exposed to oxygen, causing an insufficient oxidization of fat. As such, a large amount of fat is dissolved from the meat into the soup, which leaves a thick layer of oil floating on the surface of the soup, to affect people's health and the taste of the soup.

SUMMARY

The present disclosure provides a soup cooking control method for a pressure cooker, a pressure cooker, and a computer-readable storage medium, aiming to solve the problem that when using the existing pressure cooker to make the soup, insufficient oxidation will cause large amounts of fat in the meat to dissolve in the soup, to affect people's health and the taste of the soup.

One embodiment of the present disclosure provides a soup cooking control method for a pressure cooker. The pressure cooker includes a pressure relief valve and a heating body; the soup cooking control method includes stages of cooking the soup: a preheating and temperature-increasing stage, a medium-high temperature maintenance stage, a high pressure maintenance stage, and a decompression exhaust stage; and the medium-high temperature maintenance stage includes:

opening the pressure relief valve, to allow the pressure cooker to be in a non-closed state; and controlling, under the non-closed state of the pressure cooker, the heating body to supply heat with a first preset heating power, and maintaining an internal temperature of the pressure cooker at a first preset temperature within a first preset duration.

In some embodiments, the pressure cooker further includes an air pump; the operation of opening the pressure relief valve, to allow the pressure cooker to be in a non-closed state includes:

turning the air pump on, and drawing external air into the pressure cooker, to allow the pressure cooker in the non-closed state.

In some embodiments, the preheating and temperature-increasing stage includes:

controlling the heating body to supply heat with a second preset heating power, and increasing the internal temperature of the pressure cooker to a second preset temperature within a second preset duration; the second preset heating power is configured to be adjusted in a range from 10/16 to 16/16 of a maximum power of the pressure cooker, or in a range from 10/16 to 16/16 of a rated power of the pressure cooker.

In some embodiments, the pressure relief valve is open in the medium-high temperature maintenance stage; and the high pressure maintenance stage includes:

closing the pressure relief valve, and controlling the heating body to supply heat with a third preset heating power, to increase the internal temperature of the pressure cooker to a third preset temperature; the third preset temperature ranges from 110° C. to 120° C.

In some embodiments, the first preset temperature ranges from 70° C. to 90° C.; the first preset duration ranges from 10 minutes to 40 minutes; and a flow speed of the external air drawn by the air pump ranges from 10 L/min to 100 L/min.

In some embodiments, before the operation of controlling the heating body to supply heat with a second preset heating power, the soup cooking control method further includes:

controlling the pressure cooker to select the second preset heating power according to an input type of a meat product.

In some embodiments, the high pressure maintenance stage further includes:

maintaining an internal pressure of the pressure cooker at a preset pressure within a third preset duration; the preset pressure ranges from 50 kPa to 70 kPa, and the third preset duration ranges from 10 minutes to 40 minutes.

In some embodiments, the decompression exhaust stage includes:

controlling the pressure relief valve to intermittently exhaust within a fourth preset duration, to allow an internal pressure of the pressure cooker to be a normal pressure, for example, the standard atmosphere (101.325 kPa); the fourth preset duration ranges from 8 minutes to 15 minutes.

Another embodiment of the present disclosure provides a pressure cooker, including: an air pump, a heating body, a pressure relief valve, a memory, a processor, a communication bus, and a soup cooking control program for a pressure cooker stored in the memory;

the communication bus is configured to communicatively connect the processor and the memory; and the processor is configured to execute the soup cooking control program to perform the following operations:

opening the pressure relief valve, to allow the pressure cooker to be in a non-closed state; and controlling, under the non-closed state of the pressure cooker, the heating body to supply heat with a first preset heating power, and maintaining an internal temperature of the pressure cooker at a first preset temperature within a first preset duration.

In some embodiments, the pressure cooker further includes an air pump; and the operation of opening the pressure relief valve, to allow the pressure cooker to be in a non-closed state includes:

turning the air pump on, and drawing external air into the pressure cooker, to allow the pressure cooker in the non-closed state.

In some embodiments, the preheating and temperature-increasing stage includes:

controlling the heating body to supply heat with a second pre-set heating power, and increasing the internal temperature of the pressure cooker to a second pre-set temperature within a second pre-set duration; the second pre-set heating power is configured to be adjusted in a range from 10/16 to 16/16 of a maximum power of the pressure cooker, or in a range from 10/16 to 16/16 of a rated power of the pressure cooker.

In some embodiments, the pressure relief valve is open in the medium-high temperature maintenance stage; and the high pressure maintenance stage includes:

closing the pressure relief valve, and controlling the heating body to supply heat with a third pre-set heating power, to increase the internal temperature of the pressure cooker to a third pre-set temperature; the third pre-set temperature ranges from 110° C. to 120° C.

In some embodiments, the first pre-set temperature ranges from 70° C. to 90° C.; the first pre-set duration ranges from 10 minutes to 40 minutes; and a flow speed of the external air drawn by the air pump ranges from 10 L/min to 100 L/min.

In some embodiments, before the operation of controlling the heating body to supply heat with a second pre-set heating power, the soup cooking control method further includes:

controlling the pressure cooker to select the second pre-set heating power according to an input type of a meat product.

In some embodiments, the high pressure maintenance stage further includes:

maintaining an internal pressure of the pressure cooker at a pre-set pressure within a third pre-set duration and the pre-set pressure ranges from 50 kPa to 70 kPa, and the third pre-set duration ranges from 10 minutes to 40 minutes.

In some embodiments, the decompression exhaust stage includes:

controlling the pressure relief valve to intermittently exhaust within a fourth pre-set duration, to allow an internal pressure of the pressure cooker to be a normal pressure, for example, the standard atmosphere (101.325 kPa);

the fourth pre-set duration ranges from 8 minutes to 15 minutes.

In yet another embodiment of the present disclosure provides a computer-readable storage medium storing one or more than one programs. The one or more than one programs when being executed by one or more than one processors perform the following operations:

opening the pressure relief valve, to allow the pressure cooker to be in a non-closed state; and controlling, under the non-closed state of the pressure cooker, the heating body to supply heat with a first preset heating power, and maintaining an internal temperature of the pressure cooker at a first preset temperature within a first preset duration.

In accordance with the present disclosure, the pressure cooker herein has the medium-high temperature maintenance stage in the process of cooking the soup. The medium-high temperature maintenance stage includes: opening the pressure relief valve, to allow the pressure cooker to be in the non-closed state; and under the non-closed state of the pressure cooker, controlling the heating body to supply heat with the first preset heating power, and maintaining the internal temperature of the pressure cooker at the first preset temperature within the first preset duration. Since the fat in the meat can be oxidatively decomposed by external ambient air or internal air of the pressure cooker in the medium-high temperature maintenance stage, the fat content in the soup can be reduced, and after which the soup flavor can be stronger, to enhance the taste of the soup.

DETAILED DESCRIPTION OF THE INVENTION

It will be appreciated that the embodiments described herein are merely illustrative of the present disclosure and are not intended to limit the present disclosure.

In the present disclosure, terms such as "first", "second", "third", and "fourth" are merely used for purposes of description and are not intended to indicate or imply relative importance or to imply the number of indicated embodiments.

In order to better understand the present disclosure, in the embodiments provided herein, a pressure cooker includes a heating body or a heating plate, a pressure relief valve, a pressure sensor, and a temperature sensor. The pressure relief valve is arranged on a pressure cooker cover, the heating body or the heating plate is configured to supply heat for the pressure cooker, the pressure sensor is configured to detect an internal pressure of the pressure cooker, and the temperature sensor is configured to detect an internal temperature of the pressure cooker. In one embodiment, the temperature sensor may be a temperature probe.

Figure 1:
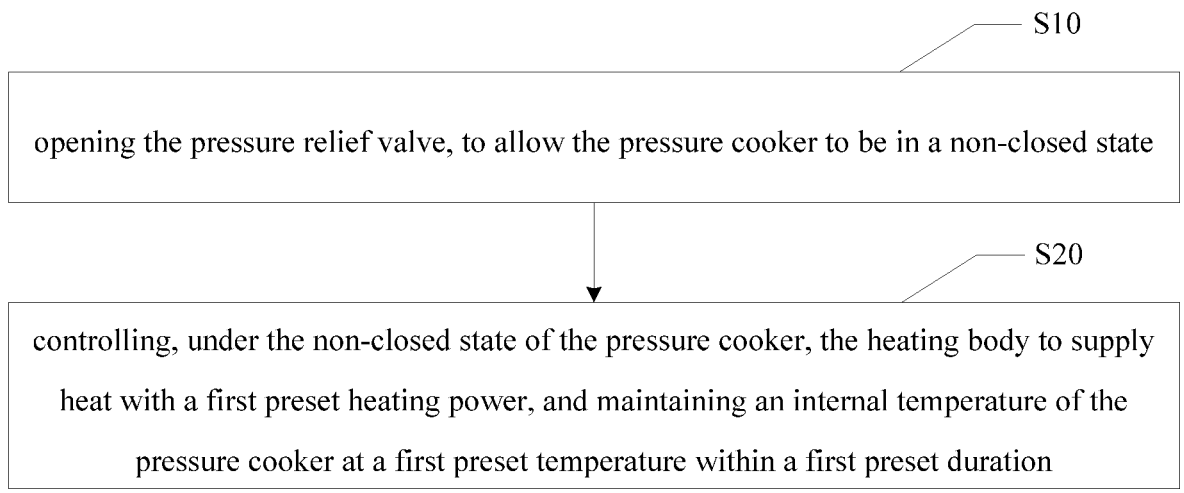
FIG. 1 is a flow diagram of a medium-high temperature maintenance stage in a soup cooking control method for a pressure cooker according to a first embodiment of the present disclosure.

The present disclosure provides a soup cooking control method for a pressure cooker, including the following stages of cooking the soup: a preheating and temperature-increasing stage, a medium-high temperature maintenance stage, a high pressure maintenance stage, and a decompression exhaust stage. In a first embodiment, referring to FIGS. 1 and 2, the medium-high temperature maintenance stages includes:

Step S10, opening the pressure relief valve, to allow the pressure cooker to be in a non-closed state.

In embodiments provided in the present disclosure, foods in the soup cooked in the pressure cooker include meat products, which are taken as examples for the following description. Typically, the meat products include pork, chicken, duck, beef, mutton, fish, and the like. In one embodiment, a control panel of the pressure cooker is provided with corresponding buttons for selecting types of the meat products, and the pressure cooker can obtain the type of the meat product cooked therein. In this embodiment, a fat content of the meat product is greater than or equal to a preset fat content, such as the fat content of the meat product is greater than 10 g or the fat content of the meat product is greater than 20 g. The fat content of the meat product may be obtained through a detecting device in the pressure cooker, or may be input by a user through the control panel.

In this embodiment, during the process of cooking the soup, the pressure cooker has the preheating and temperature-increasing stage before the medium-high temperature maintenance stage. In the preheating and temperature-increasing stage, the meat product is rapidly heated up, and in response to the temperature reaching a second pre-set temperature, the preheating and temperature-increasing stage ends and the medium-high temperature maintenance stage begins. The medium-high temperature herein refers to that an internal temperature of the pressure cooker ranges from 70° C. to 90° C. In particular, the medium-high temperature refers to that the internal temperature of the pressure cooker ranges from 70° C. to 80° C., or ranges from 80° C. to 90° C. In response to a detection that the pressure cooker enters the medium-high temperature maintenance stage, the pressure relief valve is controlled to be open. The pressure relief valve may be installed in a preset area of the pressure cooker cover. In response to the opening of the pressure relief valve, the pressure cooker is in the non-closed state, and thus can perform air exchange with external environment.

Step S20, controlling, under the non-closed state of the pressure cooker, the heating body to supply heat with a first preset heating power, and maintaining an internal temperature of the pressure cooker at a first preset temperature within a first preset duration.

In this embodiment, the non-closed state of the pressure cooker refers to a state in which the pressure relief valve of the pressure cooker is open. In addition to the internal air or oxygen, the pressure cooker can also exchange air with the external environment. Under the non-closed state of the pressure cooker, the heating body is controlled to supply heat with the first preset heating power. In particular, the first preset heating power may be flexibly arranged according to the types of the meat products. The first preset heating power may vary with the different type of the meat product. In one embodiment, the first preset heating power for pork soup may be different from the first preset heating power for fish soup. In one embodiment, the first preset heating power corresponding to the meat product of a predetermined type may be set based on a predetermined power adjustment ratio for a rated power or maximum power of the pressure cooker. In this embodiment, the first preset heating power may be less than or equal to the rated power of the pressure cooker, and the internal temperature of the pressure cooker is maintained at the first preset temperature for the first preset duration; the first preset temperature ranges from 70° C. to 90° C., and the first preset duration ranges from 10 minutes to 40 minutes. In particular, the ranges of the first preset temperature and the first preset duration may be associated with the type of the meat product. Taking the fish soup, in one embodiment, the first preset temperature ranges from 75° C.~80° C., and the first preset duration ranges from 10 minutes to 20 minutes. In the medium-high temperature maintenance stage, the fat content in the meat product or the soup is greatly reduced, and after which content of volatile flavor substances in the soup is greatly enhanced. Through experiments, after adding the medium-high temperature maintenance stage in the process of the pressure cooker cooking the soup, changes of the fat content in the meat or the soup are shown in TABLE 1.

Comparison Table of Fat Content:

TABLE 1

| Indicator | Without the medium-high temperature maintenance stage | With the medium-high temperature maintenance stage |
| --- | --- | --- |
| Fat content in meat product (g/100 g) | 1.201 | 0.595 |
| Fat content in soup (g/100 g) | 10.655 | 7.632 |

Through experiments, after adding the medium-high temperature maintenance stage in the process of the pressure cooker cooking the soup, specific changes of the volatile flavor substance content in the meat or the soup are shown in TABLE 2.

Comparison Table of Volatile Flavor Substance Content:

TABLE 2

| Indicator | Without the medium-high temperature maintenance stage | With the medium-high temperature maintenance stage |
| --- | --- | --- |
| Aaldehydes (µg/100 ml) | 3.584 | 5.843 |
| Ketones (µg/100 ml) | 0.354 | 0.164 |
| Hydrocarbons (µg/100 ml) | 4.531 | 7.564 |
| Alcohol (µg/100 ml) | 0.649 | 1.067 |
| Esters (µg/100 ml) | 0.591 | 0.943 |
| Furans (µg/100 ml) | 0.134 | 0.381 |
| Total volatile flavour substance content (µg/100 ml) | 9.843 | 15.962 |

In this embodiment, the pressure cooker includes the pressure relief valve, and the soup cooking control method additionally has the medium-high temperature maintenance stage. The medium-high temperature maintenance stage includes: opening the pressure relief valve, to allow the pressure cooker to be in a non-closed state; and under the non-closed state of the pressure cooker, controlling the heating body to supply heat with a first preset heating power, and maintaining an internal temperature of the pressure cooker at a first preset temperature for a first preset duration. Since the fat in the meat can be oxidatively decomposed by external ambient air or internal air of the pressure cooker in the medium-high temperature maintenance stage, the fat content in the soup is reduced, and after which the soup flavor is stronger, to enhance the taste of the soup.

Figure 3:
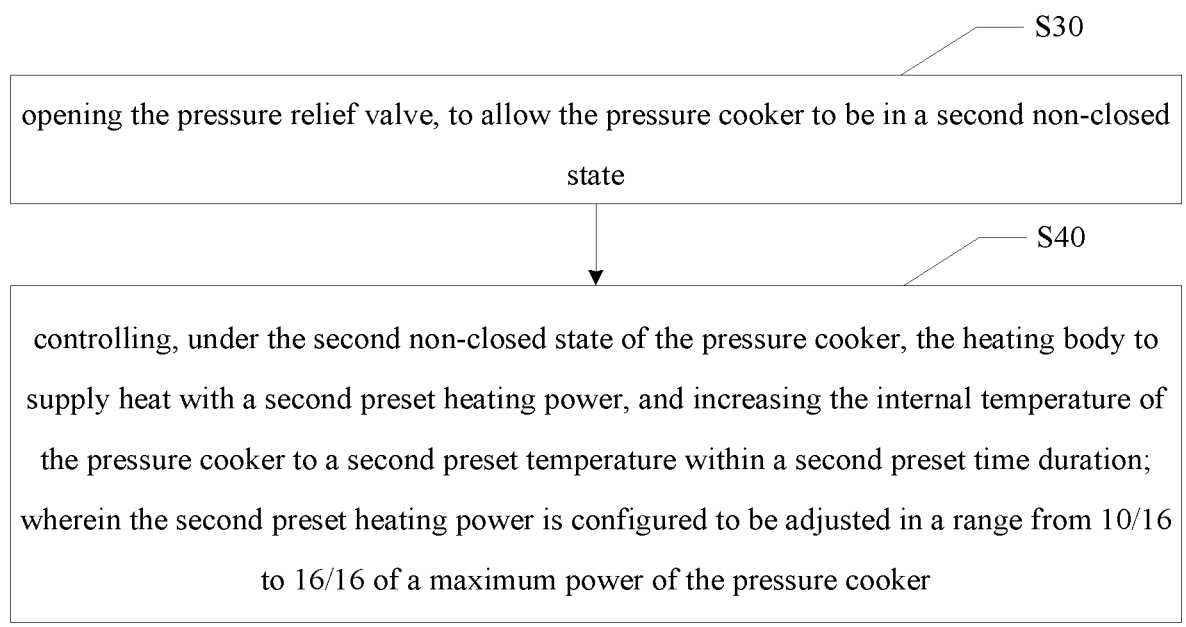
FIG. 3 is a flow diagram of a preheating and temperature-increasing stage in a soup cooking control method for a pressure cooker according to a second embodiment of the present disclosure.

Further, on the basis of the first embodiment of the soup cooking control method, the present disclosure provides a second embodiment of the soup cooking control method. As shown in FIG. 3, in the second embodiment, the pressure cooker further includes an air pump, and the operation of opening the pressure relief valve, to allow the pressure cooker to be in a non-closed state includes:

Step S11, turning the air pump on, and drawing external air into the pressure cooker, to allow the pressure cooker in the non-closed state.

In this embodiment, in the medium-high temperature maintenance stage, the pressure relief valve may be open, and the air pump is turned on. The air pump may be installed in a preset area inside the pressure cooker. The air pump is operated at a pre-set power, to allow a ventilation passage communicating the internal of the pressure cooker and the external environment and to draw the external ambient air into the pressure cooker at a pre-set drawing speed. The pressure cooker can exchange air with the external environment through the air pump, to effectively obtain fresh air or oxygen outside. In this embodiment, the external ambient air is introduced into the pressure cooker by the air pump, and as compared with the first embodiment in which the air pump is absent, the fat content in the meat or the soup is further reduced, and the content of the volatile flavor or fragrance substances in the soup is further enhanced. Through experiments, after adding the medium-high temperature maintenance stage and the ventilation by the air pump in the process of the pressure cooker cooking the soup, specific changes of the fat content in the meat or the soup are shown in TABLE 3, and specific changes of the volatile flavor substance content are shown in TABLE 4.

Comparison Table of Fat Content:

TABLE 3

| Indicator | Without the medium-high temperature maintenance stage | With the medium-high temperature maintenance stage | With the medium-high temperature maintenance stage and ventilation |
|---|---|---|---|
| Fat content in meat product (g/100 g) | 1.201 | 0.595 | 0.367 |
| Fat content in soup (g/100 g) | 10.655 | 7.632 | 6.492 |

Comparison Table of Volatile Flavor Substance Content:

TABLE 4

| Indicator | Without the medium-high temperature maintenance stage | With the medium-high temperature maintenance stage | With the medium-high temperature maintenance stage and ventilation |
|---|---|---|---|
| Aaldehydes (µg/100 ml) | 3.584 | 5.843 | 5.915 |
| Ketones (µg/100 ml) | 0.354 | 0.164 | 0.394 |
| Hydrocarbons (µg/100 ml) | 4.531 | 7.564 | 8.164 |
| Alcohol (µg/100 ml) | 0.649 | 1.067 | 2.647 |
| Esters (µg/100 ml) | 0.591 | 0.943 | 1.681 |
| Furans (µg/100 ml) | 0.134 | 0.381 | 0.632 |
| Total volatile flavour substance content (µg/100 ml) | 9.843 | 15.962 | 19.433 |

In this embodiment, the air pump is turned on, so that the external ambient air is introduced into the pressure cooker, making the pressure cooker in the non-closed state. As such, sufficient air is allowed to enter the pressure cooker during the medium-high temperature maintenance stage, to oxidatively decompose the fat in the meat. Thus, the fat content in the soup can be reduced, and after which the soup flavour can be stronger, to enhance the taste of the soup.

Further, on the basis of the second embodiment of the soup cooking control method, the present disclosure provides a third embodiment of the soup cooking control method. In the third embodiment, the first preset temperature ranges from 70° C. to 90° C., the first preset duration ranges from 10 minutes to 40 minutes, and the flow speed of the external air drawn by the air pump ranges from 10 L/min to 100 L/min.

In this embodiment, the power of the air pump is adjustable. The power of the air pump may be adjusted in a range from 1 W to 5 W. In addition, the power of the air pump may be automatically adjusted during the process of cooking the soup, or may be predetermined before the soup cooking. Taking the pork soup for example, in order to fully decompose the fat in the pork, the power of the air pump is set to 3 W before the soup cooking; during the soup cooking, in response to the pressure cooker detecting the undecomposed fat content in the pork being higher than the preset fat content, the power of the air pump is adjusted to 5 W, and the flow speed of the external air drawn by the air pump is adjusted in a range from 10 L/min to 100 L/min. The flow speed of the external air drawn by the air pump is positively related to the power of the air pump. That is, the flow speed of the external air drawn by the air pump increases with the increasing power of the air pump. In this embodiment, the first preset temperature ranges from 70° C. to 90° C., and the preset duration ranges from 10 minutes to 40 minutes. In one embodiment, the first preset temperature may range from 70° C. to 75° C., or from 75° C. to 80° C., or from 80° C. to 85° C., or from 85° C. to 90° C.; additionally, the first preset duration ranges from 10 minutes to 20 minutes, or from 20 minutes to 30 minutes, or from 30 minutes to 40 minutes.

In this embodiment, the first preset temperature ranges from 70° C. to 90° C., the first preset duration ranges from 10 minutes to 40 minutes, and the flow speed of the external air drawn by the air pump ranges from 10 L/min to 100 L/min. Therefore, sufficient oxygen is allowed to enter the pressure cooker, to effectively oxidize and decompose the fat in the meat during the medium-high temperature maintenance stage, to reduce the fat content in the soup.

Further, on the basis of the first embodiment of the soup cooking control method, the present disclosure provides a fourth embodiment of the soup cooking control method. In the fourth embodiment, the preheating and temperature-increasing stage includes:

controlling the heating body to supply heat with a second preset heating power, and increasing the internal temperature of the pressure cooker to a second preset temperature within a second preset duration; where the second preset heating power is configured to be adjusted in a range from 10/16 to 16/16 of a maximum power of the pressure cooker, or in a range from 10/16 to 16/16 of a rated power of the pressure cooker.

After a user places a washed meat product in the pressure cooker and starts it, the pressure cooker enters the preheating and temperature-increasing stage. In the preheating and temperature-increasing stage, the pressure relief valve may be open or closed, and the heating body is controlled to supply heat with the second preset heating power, to raise the internal temperature of the pressure cooker up to the second preset temperature within the second preset duration. The second preset duration may range from 5 minutes to 10 minutes, and the second preset heating power is adjustable in a range from 10/16 to 16/16 of a maximum power of the pressure cooker, or in a range from 10/16 to 16/16 of a rated power of the pressure cooker, that is, a power adjustment ratio is 10/16-16/16. In an embodiment, if the rated power of the pressure cooker is 1250 W, and the power adjustment ratio is 10/16, then the second preset heating power is 10/16 of the rated power of 1250 W.

In this embodiment, the heating body is controlled to supply heat with the second pre-set heating power, to raise the internal temperature of the pressure cooker to the second pre-set temperature within the second preset duration; the second preset heating power is configured to be adjusted in a range from 10/16 to 16/16 of the maximum power of the pressure cooker, or in a range from 10/16 to 16/16 of the rated power of the pressure cooker. Therefore, the second preset heating power can be effectively adjusted during the preheating and temperature-increasing stage, and accordingly the degree of heating can be under control.

Further, on the basis of the fourth embodiment of the soup cooking control method, the present disclosure provides a fifth embodiment of the soup cooking control method. In the fifth embodiment, before the operation of controlling the heating body to supply heat with a second preset heating power, the soup cooking control method includes:

controlling the pressure cooker to select the second preset heating power according to an input type of a meat product.

It can be appreciated that the meat products of the different types may need to have different degrees of heating, thus in the preheating and temperature-increasing stage, the pressure cooker may select the second pre-set heating power according to the specific type of the meat product. The second preset heating power may be selected by adjusting the power adjustment ratio, where the power adjustment ratio ranges from 10/16 to 16/16. In case that the power adjustment ratio is 16/16, the pressure cooker is able to heat the meat product with the preset maximum heating power.

In this embodiment, the pressure cooker is controlled to select the second preset heating power according to the type of the meat product in the preheating and temperature-increasing stage, and thus different meat products can be subjected to different preheating and temperature-increasing processes.

Further, on the basis of the first embodiment of the soup cooking control method, the present disclosure provides a sixth embodiment of the soup cooking control soup cooking control method. In the sixth embodiment, the pressure relief valve is open in the medium-high temperature maintenance stage. The high pressure maintenance includes:

closing the pressure relief valve, controlling the heating body to supply heat with a third preset heating power to raise the internal temperature of the pressure cooker to a third preset temperature, and maintaining the third preset temperature.

Figure 2:
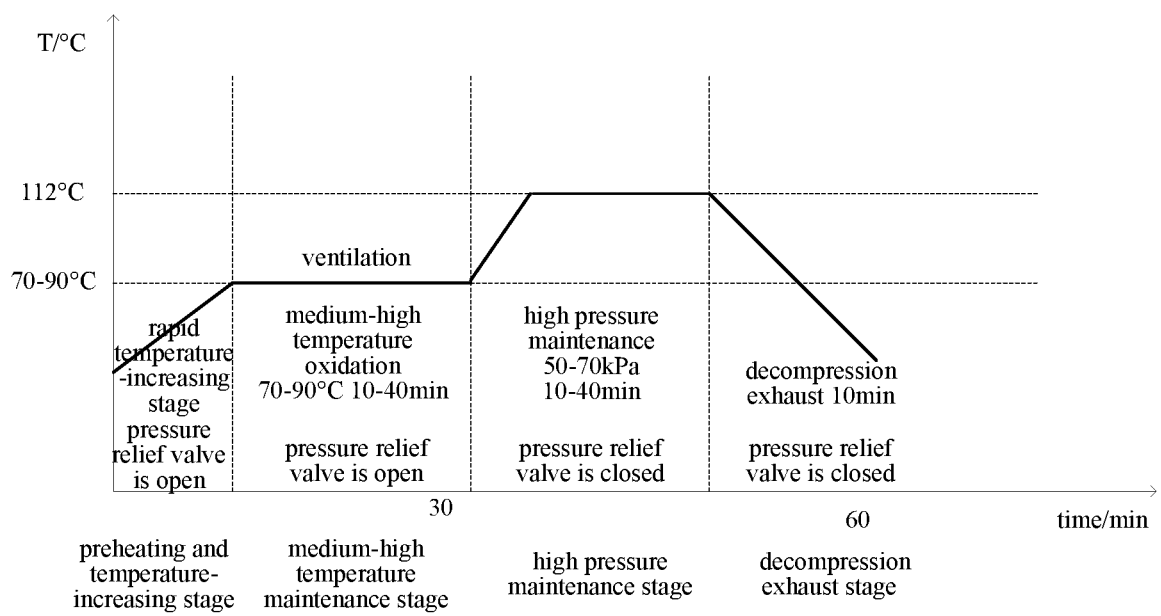
FIG. 2 is a schematic diagram illustrating changes in parameters over stages of cooking soup in a soup cooking control method for a pressure cooker according to an embodiment of the present disclosure.

In the high pressure maintenance stage, the pressure relief valve and the air pump are closed; accordingly, the pressure cooker is in the closed state, and the heating body is controlled to supply heat with the third preset heating power, to raise the internal temperature of the pressure cooker to the third preset temperature and maintain the internal temperature at the third preset temperature, where the third preset temperature is 112° C., as shown in FIG. 2.

In this embodiment, during the high pressure maintenance stage, the pressure relief valve is closed, and the heating body is controlled to supply heat with the third pre-set heating power, so that the internal temperature of the pressure cooker is increased up to the third pre-set temperature and then maintained at the third pre-set temperature; the third preset temperature ranges from 110° C. to 120° C. Therefore, the meat product can be heated to boiling in the high pressure maintenance stage, to enhance the taste of the meat soup.

Further, on the basis of the sixth embodiment of the soup cooking control method, the present disclosure provides a seventh embodiment of the soup cooking control method. In the seventh embodiment, the high pressure maintenance stage further includes:

maintaining an internal pressure of the pressure cooker at a preset pressure within a third preset duration, where the preset pressure ranges from 50 kPa to 70 kPa, and the third preset duration ranges from 10 minutes to 40 minutes.

The pressure cooker is in the closed state during the high pressure maintenance stage, and the internal pressure of the pressure cooker is controlled to maintain at the preset pressure for the third preset duration. The preset pressure ranges from 50 kPa to 70 kPa, in one embodiment ranging from 50 kPa to 60 kPa, or from 60 kPa to 70 kPa. The third preset duration ranges from 10 minutes to 40 minutes, in another embodiment ranging from 10 minutes to 20 minutes, or from 20 minutes to 30 minutes, or from 30 minutes to 40 minute.

In this embodiment, the internal pressure of the pressure cooker is controlled to maintain at the preset pressure for the third pre-set duration; the preset pressure ranges from 50 kPa to 70 kPa, and the third preset duration ranges from 10 minutes to 40 minutes. Thus, the taste of the meat product can be improved.

Further, on the basis of the first embodiment of the soup cooking control method, the present disclosure provides an eighth embodiment of the soup cooking control method. In the eighth embodiment, the decompression exhaust stage includes:

Controlling the pressure relief valve to intermittently exhaust within a fourth preset duration, to allow an internal pressure of the pressure cooker to be a normal pressure, for example, the standard atmosphere (101.325 kPa), where the fourth preset duration ranges from 8 minutes to 15 minutes.

In the decompression exhaust stage, the pressure relief valve can intermittently exhaust. For example, suppose that the fourth pre-set duration is 10 minutes, the internal pressure of the pressure cooker is reduced to the external pressure or the normal pressure, for example, the standard atmosphere (101.325 kPa) within 10 minutes.

In this embodiment, the pressure relief valve is controlled to intermittently exhaust, to allow the internal pressure of the pressure cooker to be the normal pressure, for example, the standard atmosphere (101.325 kPa) within the fourth pre-set duration, where the fourth pre-set duration is 10 minutes, which can maintain the flavor of the meat soup during the decompression exhaust stage.

Figure 4:
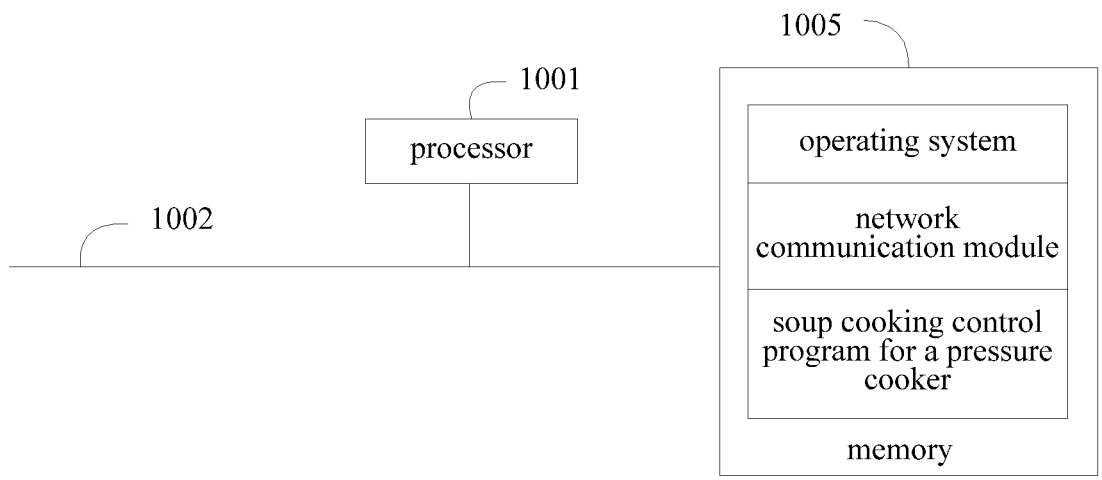
FIG. 4 is a structural schematic view of a pressure cooker according to an embodiment of the present disclosure.

Please refer to FIG. 4, FIG. 4 is a structural schematic view of a pressure cooker according to an embodiment of the present disclosure.

As shown in FIG. 4, the present disclosure also provides a pressure cooker. The pressure cooker may include: a processor 1001, such as CPU, a memory 1005, and a communication bus 1002. The communication bus 1002 is configured to facilitate connection and communication between the processor 1001 and the memory 1005. The memory 1005 may be a high-speed RAM memory, or a non-volatile memory such as a disk memory. The memory 1005 in one embodiment may also be a storage device that is separate from the processor 1001 described above.

In one embodiment, the pressure cooker may also include a user interface, a network interface, a RF (Radio Frequency) circuitry, a sensor, and the like. The user interface may include a display, an input device such as a keyboard on the control panel of the pressure cooker, and in a further embodiment an user interface may also include a standard wired interface and wireless interface. The network interface may in one embodiment include a standard wired interface, and a wireless interface (such as a WI-FI interface).

It will be appreciated that the structure of the pressure cooker shown in FIG. 4 does not constitute a limitation on the pressure cooker in the present disclosure. The pressure cooker may include more or fewer parts than shown, some of which may be combined or in different arrangements.

As shown in FIG. 4, the memory 1005 as a computer storage medium may include an operating system, a network communication device, and a soup cooking control program for a pressure cooker. The operating system is a program that manages and controls hardware and software resources of the pressure cooker, and supports the operation of the soup cooking control program and other software and/or programs. The network communication device is configured to realize communication between components in the memory 1005 and communication with other hardware and software in the pressure cooker.

As shown in FIG. 4, the soup cooking control method includes stages of cooking the soup: a preheating and temperature-increasing stage, a medium-high temperature maintenance stage, a high pressure maintenance stage, and a decompression exhaust stage; the processor is configured to execute the soup cooking control program, to perform the operations during the medium-high temperature maintenance stage:

opening the pressure relief valve, to allow the pressure cooker to be in a non-closed state; and controlling, under the non-closed state of the pressure cooker, the heating body to supply heat with a first preset heating power, and maintaining an internal temperature of the pressure cooker at a first preset temperature within a first preset duration.

In an embodiment, the pressure cooker further includes an air pump; the operation of opening the pressure relief valve, to allow the pressure cooker to be in a non-closed state includes:

controlling the air pump to turn on, and drawing external air into the pressure cooker, to allow the pressure cooker in the non-closed state.

In an embodiment, the first preset temperature ranges from 70° C. to 90° C., the first preset duration ranges from 10 minutes to 40 minutes, and a flow speed of the external air drawn by the air pump ranges from 10 L/min to 100 L/min.

In an embodiment, the preheating and temperature-increasing stage includes:

controlling the heating body to supply heat with a second preset heating power, and increasing the internal temperature of the pressure cooker to a second preset temperature within a second preset duration; where the second preset heating power is configured to be adjusted in a range from 10/16 to 16/16 of a maximum power of the pressure cooker, or in a range from 10/16 to 16/16 of a rated power of the pressure cooker.

In an embodiment, before the operation of controlling the heating body to supply heat with a second preset heating power, the soup cooking control method further includes:

controlling the pressure cooker to select the second preset heating power according to an input type of a meat product.

In an embodiment, the pressure relief valve is open in the medium-high temperature maintenance stage; and the high pressure maintenance stage includes:

closing the pressure relief valve, controlling the heating body to supply heat with a third preset heating power to raise the internal temperature of the pressure cooker to a third preset temperature, and maintaining the third preset temperature; where the third preset temperature ranges from 110° C. to 120° C.

In an embodiment, the high pressure maintenance stage further includes:

maintaining an internal pressure of the pressure cooker at a preset pressure within a third preset duration; where the preset pressure ranges from 50 kPa to 70 kPa, and the third preset duration ranges from 10 minutes to 40 minutes.

In an embodiment, the decompression exhaust stage includes:

controlling the pressure relief valve to intermittently exhaust, to allow an internal pressure of the pressure cooker to be a normal pressure, for example, the standard atmosphere (101.325 kPa) within a fourth preset duration; where the fourth preset duration ranges from 8 minutes to 15 minutes.

What is claimed is:

1. A soup cooking control method for a pressure cooker, wherein the pressure cooker comprises a pressure relief valve, an air pump and a heating body;

the soup cooking control method comprises:
a preheating and temperature-increasing stage,
a medium-high temperature maintenance stage,
a high pressure maintenance stage, and a decompression exhaust stage;
wherein the medium-high temperature maintenance stage comprises:
opening the pressure relief valve, turning on the air pump and drawing external air into the pressure cooker to place the pressure cooker in a non-closed state; and
controlling, under the non-closed state of the pressure cooker, the heating body to supply heat with a first preset heating power, and maintaining an internal temperature of the pressure cooker at a first preset temperature within a first preset duration;
wherein the first preset temperature ranges from 70° C. to 90° C.

2. The soup cooking control method according to claim 1, wherein:
the preheating and temperature-increasing stage comprises:
controlling the heating body to supply heat with a second preset heating power, and increasing the internal temperature of the pressure cooker to a second preset temperature within a second preset duration;
wherein the second preset heating power is configured to be adjusted in a range from 10/16 to 16/16 of a maximum power of the pressure cooker, or in a range from 10/16 to 16/16 of a rated power of the pressure cooker.

3. The soup cooking control method according to claim 1, wherein:
the pressure relief valve is open in the medium-high temperature maintenance stage; and
the high pressure maintenance stage comprises:
closing the pressure relief valve, and controlling the heating body to supply heat with a third preset heating power, to increase the internal temperature of the pressure cooker to a third preset temperature;

wherein the third preset temperature ranges from 110° C. to 120° C.

4. The soup cooking control method according to claim 1, wherein:
the first preset duration ranges from 10 minutes to 40 minutes; and
a flow speed of the external air drawn by the air pump ranges from 10 L/min to 100 L/min.

5. The soup cooking control method according to claim 4, wherein:
the preheating and temperature-increasing stage comprises:
controlling the heating body to supply heat with a second preset heating power, and increasing the internal temperature of the pressure cooker to a second preset temperature within a second preset duration;
wherein the second preset heating power is configured to be adjusted in a range from 10/16 to 16/16 of a maximum power of the pressure cooker, or in a range from 10/16 to 16/16 of a rated power of the pressure cooker.

6. The soup cooking control method according to claim 4, wherein:
the pressure relief valve is open in the medium-high temperature maintenance stage; and
the high pressure maintenance stage comprises:
closing the pressure relief valve, and controlling the heating body to supply heat with a third preset heating power, to increase the internal temperature of the pressure cooker to a third preset temperature;
wherein the third preset temperature ranges from 110° C. to 120° C.

7. The soup cooking control method according to claim 1, wherein:
the preheating and temperature-increasing stage comprises:
controlling the heating body to supply heat with a second preset heating power, and increasing the internal temperature of the pressure cooker to a second preset temperature within a second preset duration;
wherein the second preset heating power is configured to be adjusted in a range from 10/16 to 16/16 of a maximum power of the pressure cooker, or in a range from 10/16 to 16/16 of a rated power of the pressure cooker.

8. The soup cooking control method according to claim 7, wherein:
the pressure relief valve is open in the medium-high temperature maintenance stage; and
the high pressure maintenance stage comprises:
closing the pressure relief valve, and controlling the heating body to supply heat with a third preset heating power, to increase the internal temperature of the pressure cooker to a third preset temperature;
wherein the third preset temperature ranges from 110° C. to 120° C.

9. The soup cooking control method according to claim 7, wherein:
before the operation of controlling the heating body to supply heat with a second preset heating power, the soup cooking control method further comprises:
controlling the pressure cooker to select the second preset heating power according to an input type of a meat product.

10. The soup cooking control method according to claim 1, wherein:
the pressure relief valve is open in the medium-high temperature maintenance stage; and
the high pressure maintenance stage comprises:
closing the pressure relief valve, and controlling the heating body to supply heat with a third preset heating power, to increase the internal temperature of the pressure cooker to a third preset temperature;
wherein the third preset temperature ranges from 110° C. to 120° C.

11. The soup cooking control method according to claim 10, wherein:
the high pressure maintenance stage further comprises:
maintaining an internal pressure of the pressure cooker at a preset pressure within a third preset duration;
wherein the preset pressure ranges from 50 kPa to 70 kPa, and the third preset duration ranges from 10 minutes to 40 minutes.

12. The soup cooking control method according to claim 1, wherein:
the decompression exhaust stage comprises:
controlling the pressure relief valve to intermittently exhaust within a fourth preset duration, to allow an internal pressure of the pressure cooker to be a normal pressure;
the fourth preset duration ranges from 8 minutes to 15 minutes.

13. A pressure cooker comprising: a memory, a processor, a communication bus, and a soup cooking control program for the pressure cooker stored in the memory; wherein:
the communication bus is configured to communicatively connect the processor and the memory;
the processor is configured to execute the soup cooking control program, to perform the operations of the soup cooking control method according to claim 1.

14. A pressure cooker comprising: a memory, a processor, a communication bus, and a soup cooking control program for the pressure cooker stored in the memory; wherein:
the communication bus is configured to communicatively connect the processor and the memory;
the processor is configured to execute the soup cooking control program, to perform the operations of the soup cooking control method according to claim 1.

15. A non-transitory computer-readable storage medium storing a soup cooking control program for a pressure cooker, the soup cooking control program when being executed by a processor performing the operations of the soup cooking control method according to claim 1.

16. A non-transitory computer-readable storage medium storing a soup cooking control program for a pressure cooker, the soup cooking control program when being executed by a processor performing the operations of the soup cooking control method according to claim 1.

17. The soup cooking control method according to claim 12, wherein the normal pressure is standard atmospheric pressure of 101.325 kPa.

* * * * *